United States Patent [19]

Yang

[11] Patent Number: 4,855,724

[45] Date of Patent: Aug. 8, 1989

[54] COLOR FILTER GROUPING FOR ADDRESSING MATRIXED DISPLAY DEVICES

[75] Inventor: Kei-Wean C. Yang, Beaverton, Oreg.

[73] Assignee: Tektronix, Inc., Beaverton, Oreg.

[21] Appl. No.: 28,930

[22] Filed: Mar. 23, 1987

[51] Int. Cl.$^4$ ............................................. G09G 3/34
[52] U.S. Cl. ..................................... 340/703; 340/781; 340/784; 350/339 F; 358/59
[58] Field of Search ............... 340/701, 703, 784, 783, 340/811, 802, 805; 350/339 F, 339 R, 332, 333, 334, 330, 331 R; 358/59

[56] References Cited

U.S. PATENT DOCUMENTS

| | | | |
|---|---|---|---|
| 2,925,532 | 2/1960 | Larach | 340/703 |
| 3,042,834 | 5/1962 | Nicoll | 340/703 |
| 4,367,464 | 1/1983 | Kavahashi et al. | 340/703 |
| 4,593,978 | 6/1986 | Mourey et al. | 340/703 |
| 4,642,628 | 2/1987 | Murata | 340/703 |
| 4,652,912 | 3/1987 | Masubuchi | 340/703 |
| 4,653,862 | 3/1987 | Morozumi | 350/339 F |
| 4,662,720 | 5/1987 | Fergason | 350/339 F |

FOREIGN PATENT DOCUMENTS 0097627  5/1986  Japan ................................. 350/339

*Primary Examiner*—Gerald L. Brigance
*Attorney, Agent, or Firm*—John D. Winkelman; John Smith-Hill

[57] ABSTRACT

A matrixed display device comprises a plurality of monochrome optical bodies arranged in a matrix of intersecting horizontal rows and vertical columns and an optical bandpass filter element associated with each such body. The filter elements are in first, second and third arrays, passing red light, green light and blue light respectively. In each row and column of the matrix, a filter element of one of the three arrays is located between filter elements of the other two arrays. With this arrangement of filter elements, a color pixel can be formed by selectively stimulating first and second monochrome optical bodies that are adjacent each other in a first row of the matrix and a third monochrome optical body that is in a row adjacent the first row and is in the same column as one of the first and second optical bodies.

10 Claims, 4 Drawing Sheets

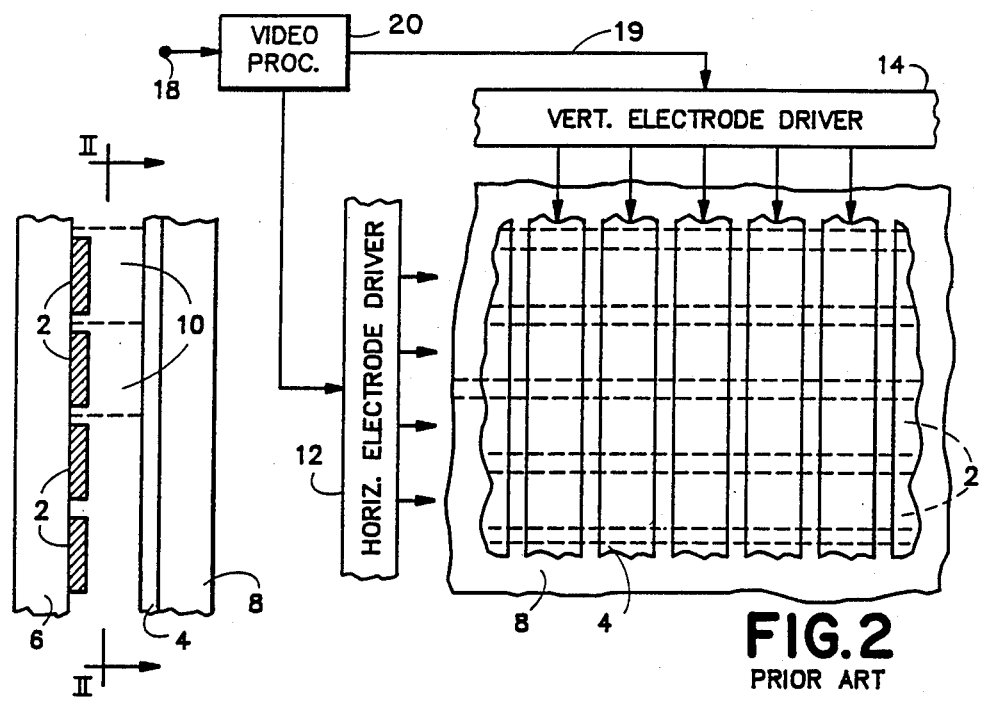
FIG. 1
PRIOR ART
FIG. 2
PRIOR ART
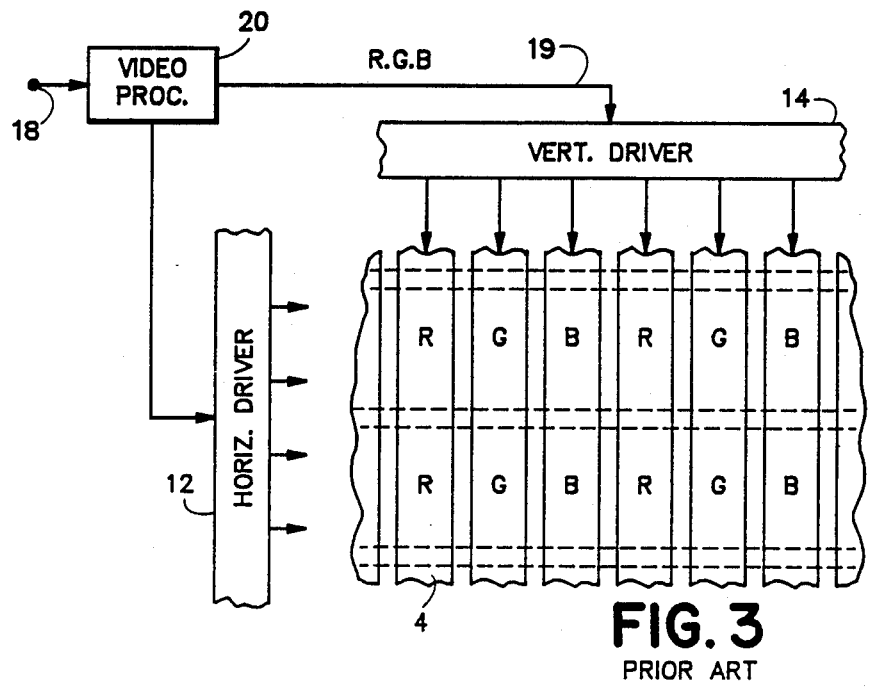
FIG. 3
PRIOR ART

COLOR FILTER GROUPING FOR ADDRESSING MATRIXED DISPLAY DEVICES

This invention relates to a color filter grouping for addressing matrixed display devices.

BACKGROUND OF THE INVENTION

FIGS. 1 and 2 illustrate a conventional matrixed display device which provides a monochrome display in response to an input video signal. The display device comprises first and second arrays of elongate, strip-form electrodes 2 and 4 supported on respective transparent substrates 6 and 8. Generally, the two arrays of electrodes are oriented orthogonally to one another. When the display device is positioned for normal use with the substrates vertical, the electrodes of the first array (referred to as the horizontal electrodes) extend horizontally and are spaced apart in the vertical direction, and the electrodes of the second array (referred to as the vertical electrodes) extend vertically and are spaced apart in the horizontal direction. The two arrays of electrodes are in spaced, crossing relationship. The positions of the horizontal electrodes 2 are shown in dashed lines in FIG. 2. At each crossing point there is an optical body 10. The term "optical body" is used herein to denote a body which controls the passage of light towards a viewer of the display device in dependence upon the electrical condition of the body. An optical body might be, for example, a liquid crystal device (LCD) which allows or prevents passage of light from a light source towards the viewer in dependence upon the electric field existing across the LCD, or a volume of electroluminescent (EL) material which emits or does not emit light in dependence upon the electric excitation to the volume of EL material. The horizontal electrodes 2 are connected to a horizontal electrode driver 12 and the vertical electrodes are connected to a vertical electrode driver 14. The vertical and horizontal electrode drivers include decoding and amplifying circuits and receive input signals from a video processor 20. The video processor 20 has an input terminal 18 at which it receives an input video signal.

The input video signal that is applied to the terminal 18 is composed of a succession of line intervals separated from each other by a horizontal sync pulse. During the active interval $T_L$ of the horizontal line time, the video signal is applied to the vertical electrode drive 14 over a line 19. If, for example, there are 300 electrodes in the horizontal array, the video processor generates a dot clock signal having 300 pulses during the active interval $T_L$ of each line and applies this signal to the vertical electrode driver 14. Analog switches (not shown) are connected between the line 19 and the vertical electrodes 4 respectively. The dot clock signal causes the driver 14 to close (i.e. render conductive) the analog switches sequentially and accordingly the video signal on the line 19 is sampled and successive sample values are applied to the vertical electrodes respectively.

For each horizontal sync pulse in the active interval of each field of the video signal, the video processor generates a row clock pulse, and after a predetermined number of row clock pulses the video processor generates a vertical reset pulse. For example, if the display device has an aspect ratio of 1:1 and there are 300 horizontal electrodes, there would be a vertical reset pulse after 300 horizontal sync pulses. The row clock signal is applied to the horizontal electrode driver 12. The row clock signal is used by the driver 12 to enable it to select horizontal electrodes 2 sequentially. The driver 12 applies a negative potential to the selected electrode 2. In this manner, the optical bodies are addressed successively and the electrical condition of an optical body depends on the level of the video signal when the body is addressed.

In a monochrome matrixed display device, each optical body corresponds to a single, separately addressable pixel. The size of the optical body depends of the width W and spacing of the stripform electrodes 2 and 4. The reciprocal of the sum $(W+S)$ is a measure of the resolution of the display.

A matrixed LC display device has been used in a flat panel color television set. In such a display device, an optical bandpass filter element (not shown) is associated with each optical body. The filters are formed by thin film deposition on the vertical electrodes 4. The filter elements are arranged in three distinct arrays in accordance with their pass bands. Thus, the pass bank of the filter elements of a first array is in the red region of the optical spectrum, that of the filter elements of a second array is in the green region, and that of the filter elements of the third array is in the blue region. A color pixel is composed of a group of three adjacent monochrome pixels having red, green and blue filter elements respectively. In the conventional arrangement of monochrome pixels and associated filter elements that is shown in FIG. 3, the three monochrome pixels that comprise a color pixel are arranged side by side in the horizontal direction and are addressed by selecting respective vertical electrodes 4 in conjunction with a single horizontal electrode 2. The video processor 20 of the color display device receives a color component video signal and includes a digitizer which generates three color component signals each having a stream of 100 digital words per line interval. The driver 14 determines which group of three vertical electrodes is to be addressed, and the three digital words associated with that group determine the potentials that will be applied to those electrodes respectively. The driver 12 determines which horizontal electrode is to be addressed.

It is generally considered desirable that the aspect ratio of a color pixel be substantially the same as the aspect ratio of the display device in which it appears. In the case of a display device having an aspect ratio of 1:1 therefore, the vertical dimension of a color pixel is about the same as its horizontal dimension. This implies that the horizontal electrodes of the color display device shown in FIG. 3 are about three times as wide as the vertical electrodes and that the number of horizontal electrodes is only 100 instead of 300; and that each monochrome pixel shown in FIG. 3 has the form of a vertically-elongated rectangle having an aspect ratio of about 1:3. The minimum linear dimension of a color pixel is therefore about three times the minimum linear dimension of a monochrome pixel. The resolution of the color display is only about one-third that of a monochrome display having electrodes with the same minimum width and spacing. In order to illuminate two adjacent color pixels in a given row, it is necessary to address six of the vertical electrodes 2.

In a display device in which each color pixel is composed of a triangular arrangement of monochrome pixels, similar to the arrangement of phosphor deposits in a delta gun color CRT, the size of the color pixel can be reduced substantially compared with the arrangement shown in FIG. 3, if the vertical electrodes are composed of hourglass-shaped segments as shown in M. Suginoya et al, "Multicolor Graphic LCD with Tri-Colored Layers Formed by Electrodeposition," Proceedings, Third International Display Research Conference, 1983, pages 206–209. Electrodes of this configuration are more difficult to fabricate than uniform width electrodes and moreover the waisting of the electrodes increases the likelihood of an open circuit and, even if there are no open circuits, results in local regions of increased resistance and causes there to be a significant variation in the line time between the top row of pixels and the bottom row of pixels.

In a third conventional pattern, the sequence in which the filter elements occur in the horizontal direction changes from line to line down a column of color pixels. The pattern repeats every three horizontal lines. For a given width of monochrome pixel, the height of each monochrome pixel is the same as that in the FIG. 3 arrangement, and accordingly there is no improvement in resolution in the third arrangement. Moreover, the fact that the sequence of monochrome pixels in a color pixel varies in a column of color pixels from line to line to line introduces complexity into the addressing of the display device. The three filter patterns that are discussed above are also described in S. Tsuruta et al, "Color Pixel Arrangement Evaluation for LC-TV", Proceedings, 1985 International Display Research Conference, 1985, pages 24–26. Other articles relating to matrixed color display devices are T. Uchida et al, "A Full-Color Matrix LCD with Color Layers on the Electrodes", Proceedings, 1982 International Display Research Conference, 1982, pages 166–170; T. Uchida, "Color LCDs: Technological Developments", Proceedings, Third International Display Research Conference, 1983, section 5.1: and M. Sugata et al, "A TFT-Addressed Liquid Crystal Color Display", Proceedings, Third International Display Research Conference, 1983, pages 210–212.

SUMMARY OF THE INVENTION

A preferred embodiment of the present invention is a matrixed display device comprising a plurality of monochrome optical bodies arranged in a matrix of intersecting horizontal rows and vertical columns and an optical bandpass filter element associated with each such body. The filter elements are in first, second and third arrays, passing red light, green light and blue light respectively. In each row and column of the matrix, a filter element of one of the three arrays is located between filter elements of the other two arrays. With this arrangement of filter elements, a color pixel can be formed by selectively stimulating first and second monochrome optical bodies that are adjacent each other in a first row of the matrix and a third monochrome optical body that is in a row adjacent the first row and is in the same column as one of the first and second optical bodies.

A preferred embodiment of the present invention in a second aspect is display apparatus comprising a display device having a plurality of monochrome optical bodies arranged in a matrix of intersecting rows and columns and a color filter element associated with each such body, the filter elements being in first, second and third arrays passing red light, green light and blue light respectively. The arrays are such that no two filter elements of any one array are adjacent each other. The apparatus also comprises addressing circuitry for selectively stimulating the monochrome optical bodies. The addressing circuitry decodes information carried by a color video signal to determine the color to be displayed by a color pixel, and creates that color pixel by stimulating to a selected degree first and second adjacent monochrome optical bodies in one row of the matrix and a third monochrome optical body in a row that is adjacent the first row and in the same column as one of the first and second monochrome optical bodies.

BRIEF DESCRIPTION OF THE DRAWINGS

For a better understanding of the invention, and to show how the same may be carried into affect, reference will now be made, by way of example, to the accompanying drawings in which:

FIG. 1 is a transverse sectional view of a conventional monochrome LC matrixed display device, FIG. 2 illustrates a conventional monochrome display apparatus including the FIG. 1 display device, the FIG. 1 display device being shown in FIG. 2 in a sectional view taken on the line II—II of FIG. 1, FIG. 3 is a view similar to FIG. 2 of a conventional color LC display apparatus.

In the different figures, like reference numerals designate corresponding elements.

The following detailed description is addressed to persons skilled in the art, and therefore information of a routine nature which can be acquired from readily-available sources and does not contribute to an understanding of the invention, has been omitted.

DETAILED DESCRIPTION

Figure 4:
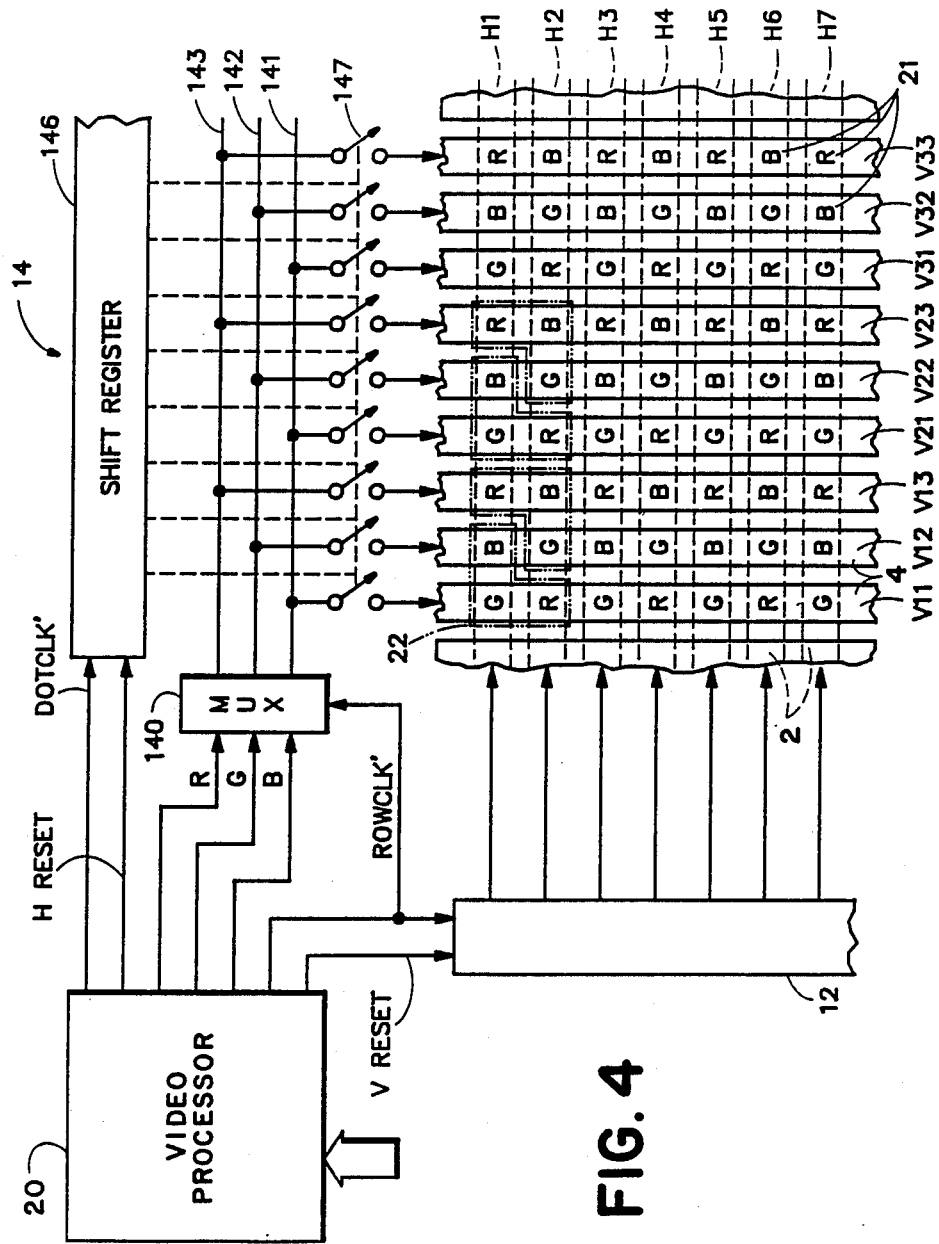
FIG. 4 is a view similar to FIG. 2 of a color LC display apparatus embodying the present invention.
Figure 5:
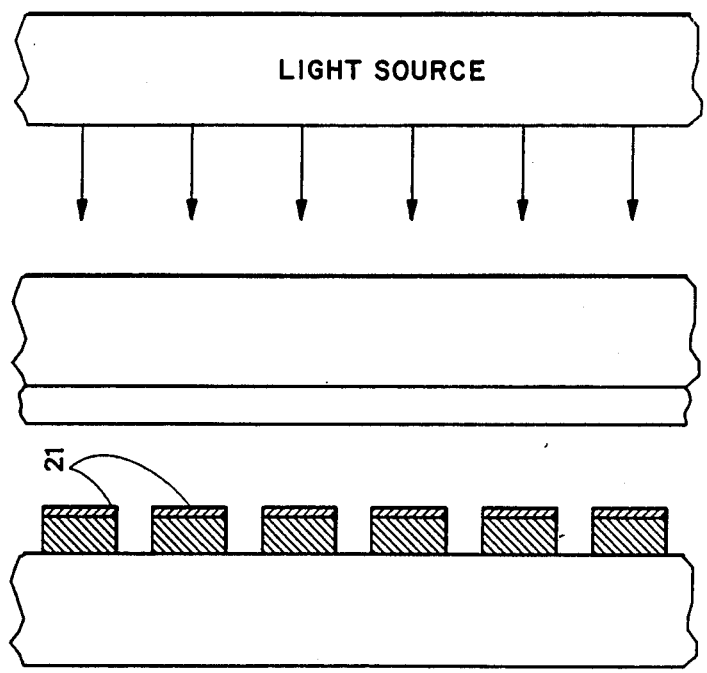
FIG. 5 is a partial transverse sectional view of the display device of the FIG. 4 apparatus.
Figure 5:
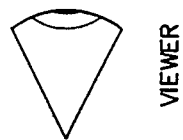

The display device of the display apparatus illustrated in FIG. 4 comprises arrays of horizontal and vertical strip-form electrodes 2 and 4. The width and spacing of the horizontal electrodes are the same as the width and spacing of the vertical electrodes. The size of each monochrome pixel defined by the crossing of a vertical electrode and a horizontal electrode is determined by the minimum achievable width and spacing of the electrodes. Therefore, the aspect ratio of each monochrome pixel is nominally 1:1. Filter elements 21 are deposited on each horizontal electrode so that a square matrix of filter elements is formed. In each row of the matrix, the colors of the filter elements repeat in the sequence R, G, B, R, G, B. In each column, only two colors are represented and the colors alternate. The pair of colors represented in a given column is different from the pairs of colors represented in each of the two columns adjacent the given column, and the pairs of colors represented in these two columns are different from each other. Each color pixel 22 is composed of first and second monochrome pixels in one row and a third monochrome pixel which is in an adjacent row and is in the same column as one of the first and second monochrome pixels. The three monochrome pixels are in an L-shaped array, as shown by dot-dashed lines in FIG. 4. For each color pixel, one monochrome pixel is in the same column as a monochrome pixel of a horizontally adjacent color pixel. Thus, the color pixels occur in partially overlapping pairs. It will be seen that the maximum number of vertical electrodes required to illuminate two adjacent pixels is either three or four, depending on the color pixels concerned.

To facilitate discussion of the invention, the vertical and horizontal electrodes in FIG. 4 have been labeled V11, V12, V13, V21, V22, V23, etc. and H1, H2, ... respectively. It will be assumed that there are 300 horizontal electrodes and 300 vertical electrodes.

The video processor 20 of the FIG. 4 display apparatus receives a video signal in R, G, B component form. The video signal is composed of a succession of video fields, each of which comprises multiple lines. Each line of the video signal has a duration $T_H$ which is composed of an active interval $T_L$ and a horizontal retrace interval $(T_H-T_L)$. Each field of the video signal has a duration $T_V$ which is composed of an active interval $T_F$ and a vertical retrace interval $(T_V-T_F)$. In this example, the active interval $T_F$ is equal to $150T_H$, so that there are 150 horizontal scanning lines in the active interval $T_F$ of each field.

Figure 6:
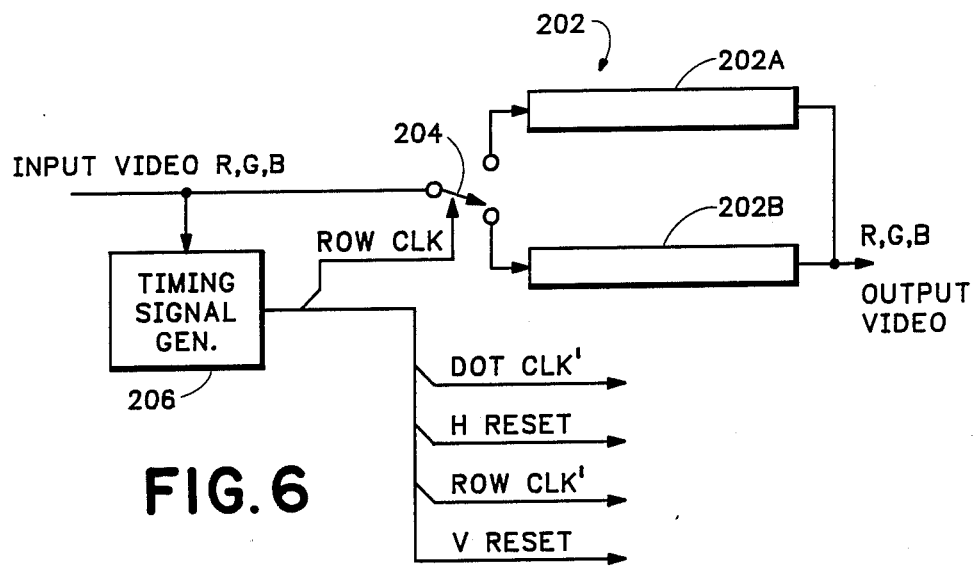
FIG. 6 is a block diagram of a video processor which is part of the FIG. 4 apparatus.

The video processor 20 is shown in greater detail in FIG. 6. The video processor comprises a line buffer 202, having two memory portions 202A and 202B, a switch 204 for selecting one of the memory portions, and a timing signal generator 206. The timing signal generator 206 generates horizontal and vertical sync signals H SYNC and V SYNC, a dot clock signal DOT CLK and a row clock signal ROW CLK. The dot clock signal has 200 pulses in the active interval $T_L$ of each line and the row clock signal has 150 pulses in the active interval $T_F$ of each field. The line buffer 202 receives and temporarily stores the R, G, B video signal. During the first line of a field of the video signal, the active portion of the video signal is written into the first memory portion 202A of the line buffer, and during the second line the active portion of the video signal is written into the second memory portion 202B while the contents of the first memory portion are read twice. The dot clock signal DOT CLK controls the rate at which the video signal is written into the line buffer and the row clock signal ROW CLK controls the selection of the first and second memory portions by the switch 204. The timing signal generator 206 also generates a driver dot clock signal DOT CLK' having 600 pulses during each horizontal line interval $T_H$ and a driver row clock signal ROW CLK' having 300 pulses during each field interval $T_V$.

The R, G, B video signal provided by the video processor 20 is applied to the vertical electrode driver 14, which includes a 3-in, 3-out multiplexer 140 having output lines 141, 142, and 143. The driver 14 also includes a shift register 146 which receives the driver dot clock signal DOT CLK' and a horizontal reset signal H RESET, which is derived from the horizontal sync signal, and analog switches 147 which are controlled by the shift register 146 and each of which is connected between one of the vertical electrodes and one of the line 141, 142 and 143. The multiplexer 140 is switched between a first state, in which it connects the R, G and B output lines of the circuit 206 to the lines 143, 141 and 142 respectively, and a second state, in which it connects the R, G and B components to the lines 141, 142 and 143 respectively, in response to the driver row clock signal ROW CLK'. The horizontal reset pulse H RESET is applied to the shift register 146 at the beginning of each read from the line buffer and is clocked through the shift register in response to the driver dot clock signal DOT CLK'. As the horizontal reset pulse H RESET propagates through the shift register, control pulses are applied to the analog switches sequentially, causing each of them to close, i.e. become conductive, and then re-open.

The driver row clock signal ROW CLK' and the vertical reset signal V RESET are applied to the horizontal electrode driver 12, which may be a shift register. The driver 12 has 300 output terminals which are connected respectively to the horizontal electrodes. At the beginning of each field of the video signal, the circuit 206 generates a vertical reset pulse V RESET which is applied to the driver 12 and is clocked through the driver in response to the driver row clock signal ROW CLK'. The horizontal electrodes are addressed in sequential fashion by the vertical reset pulse V RESET propagating through the row driver.

When an odd-numbered horizontal electrode H1, H3 etc. is addressed by the horizontal electrode driver 12, the multiplexer 140 is in its first state. Consequently, when an electrode VX1 is selected by the shift register 146, by closing the associated switch 147, the green color component signal is applied to that electrode, and when an electrode VX2 or VX3 is selected, the blue or red color component signal is applied to the electrode. When an even-numbered horizontal electrode is addressed by the row driver, the multiplexer 140 is in its second state, so that when the electrodes VX1, VX2 and VX3 are selected by the shift register 146, the red, green and blue color component signals are applied to the electrodes respectively.

The area occupied by one color pixel is approximately one-third of the area occupied by a color pixel in the arrangement described with reference to FIG. 3 and two horizontally adjacent color pixels can be activated by addressing only three or four vertical electrodes instead of six vertical electrodes. Accordingly, for a given physical density of electrodes, a greater visual density is achieved than with the apparatus described with reference to FIG. 3.

It will be appreciated that the present invention is not restricted to the particular embodiment that has been described and illustrated, and that variations may be made therein without departing from the scope of the invention as defined in the appended claims and equivalents thereof. For example, there are numerous ways of implementing appropriate vertical electrode and horizontal electrode drivers, and accordingly the invention is not restricted to the implementation that is shown in FIG. 4. The invention is not restricted to the monochrome pixels having an aspect ratio of 1:1, since in a display device that is not square it may be desired that the color pixels, and consequently the monochrome pixels also, have a different aspect ratio. Furthermore, the invention is not restricted to LC display devices but is also applicable to other matrixed display devices, such as an EL display device employing a broad band EL material. So far as the invention is concerned, a display device employing EL material would be essentially the same as the LC display device shown in FIGS. 3 and 4 except that the light source would be omitted.

I claim:
1. Matrixed display apparatus comprising:
a matrixed display device having a plurality of optical structures arranged in a matrix of intersecting rows and columns, each optical structure being actuable to control the propagation of light towards a viewer of the device, the optical structures being in first, second and third distinct arrays associated with first, second and third regions respectively of the optical spectrum, and each optical structure in a given array being selectively actuable to propagate light in the associated region of the optical spectrum towards a viewer of the device and being operative to not propagate light in the other regions of the optical spectrum towards the viewer, the first, second and third arrays being such that each optical structure in each array is one structure in a group of three structures, in the first, second and third arrays respectively, with the optical structures in the first and second arrays being in one row of the matrix and the optical structure in the third array being in a row adjacent said one row and in the same column as the optical structure in one of the first and second arrays, a video processor for receiving an input video signal composed of a succession of active line intervals and providing an output video signal having two active line intervals during a period corresponding to one active line interval of the input video signal, and the video processor also being operative to provide at least two output timing signals, selection means functionally coupled to the optical structures and operative in response to the output timing signals to select each row of optical structures for a period substantially equal to the active line interval of the output video signal, the rows being selected consecutively, and to select the optical structures in a selected row consecutively within the period for which that row is selected, and actuation means responsive to the output video signal for actuating a selected optical structure.

2. Apparatus according to claim 1, wherein each optical structure comprises an optical body that is switchable between a first condition in which it blocks transmission of light and a second condition in which it is able to transmit light in all of the first, second and third regions of the optical spectrum, and a bandpass filter element which has a substantially higher transmission for one region of the spectrum than for the other regions of the spectrum.

3. Apparatus according to claim 2, wherein each optical body is a volume of liquid crystal material, and the selection means comprise first and second sets of electrodes arranged in crossing relationship for applying an electric field selectively to the respective volumes of liquid crystal material.

4. Apparatus according to claim 2, wherein each optical body is a volume of electroluminescent material, and the selection means comprise first and second sets of electrodes arranged in crossing relationship for applying an electric field selectively to the respective volumes of electroluminescent material.

5. Apparatus according to claim 1, wherein the selection means comprise a set of row electrodes and a set of column electrodes arranged in crossing relationship, with the optical structures being at the crossing areas of the row and column electrodes, so that by selecting one row electrode and one column electrode the optical structure at the crossing area of said one row electrode and said one column electrode may be actuated, and the selection means also comprising row select means for sequentially selecting the row electrodes, and column select means for sequentially selecting the column electrodes.

6. Apparatus according to claim 5, wherein the number of row electrodes is 2m, where m is an integer greater than zero, the number of column electrodes is 3n, where is an integer greater than zero, the output video signal is composed of first, second and third color component signals, corresponding to the first, second and third arrays respectively, and the actuation means comprise a multiplexer having first, second and third output terminals, and 3n switches connected to the column electrodes respectively, the (3j+1)th switch, where j is an integer from zero to (n−1), being connected to the first output terminal of the multiplexer, the (3j+2)th switch being connected to the second output terminal of the multiplexer, and the (3j+3)th switch being connected to the third output terminal of the multiplexer, the column select means being operative to render the switches conductive sequentially and thereby select the column electrodes sequentially, and the multiplexer having a first state in which the first, second and third color component signals are applied to the first, second and third output terminals respectively and a second state in which the first, second and third component signals are applied to the second, third and first output terminals respectively, the multiplexer being placed in its first state when the row select means select the (2k−1)th row electrode, where k is an integer from 1 to m, and being placed in the second state when the row select means select the 2kth row electrode.

7. Apparatus according to claim 1, wherein the video processor comprises first and second memory portions and is operative during a first active line interval of the input video signal to write the input video signal into the first memory portion and during a second active line interval of the input video signal to write the input video signal into the second memory portion and concurrently read the contents of the first memory portion twice in succession.

8. A method of addressing a matrixed display device comprising a plurality of optical structures arranged in a matrix of intersecting rows and columns, each optical structure being actuable to control the propagation of light towards a viewer of the device, the optical structures being in first, second and third arrays associated with different respective regions of the optical spectrum, and each optical structure in a given array being selectively actuable to propagate light in the associated region of the optical spectrum towards a viewer of the device and being operative to not propagate light in the other regions of the optical spectrum towards the viewer, the first, second and third arrays being such that each optical structure in each array is one structure in a group of three structures, in the first, second and third arrays respectively, with two of the three optical structures being in one row of the matrix and one of the optical structures being in a row adjacent said one row and in the same column of the matrix as one of said two optical structures, and selection means for selecting the optical structures for actuation, said method comprising:

providing a first video signal composed of a succession of active line intervals, employing the first video signal to generate a second video signal having two active line intervals during a period corresponding to one active line interval of the first video signal, selecting the rows of the matrix consecutively during respective active line intervals of the second video signal, sequentially selecting the optical structures in the selected row, and employing the second video signal to actuate selectively the optical structures.

9. A method according to claim 8, wherein the second video signal is generated by writing the first video signal into a first memory portion during a first active line interval of the first video signal, writing the first video signal into a second memory portion during a second active line interval of the first video signal, and concurrently reading the contents of the first memory portion twice in succession and thereby providing two active lines of the second video signal.

10. The method according to claim 9, wherein m consecutive active lines of the first video signal, where m is an integer greater than zero, form a field of the first video signal, whereby each field of the second video signal is composed of 2m consecutive active lines, and the number of rows in the matrix is 2m.

* * * * *